Figure 1:
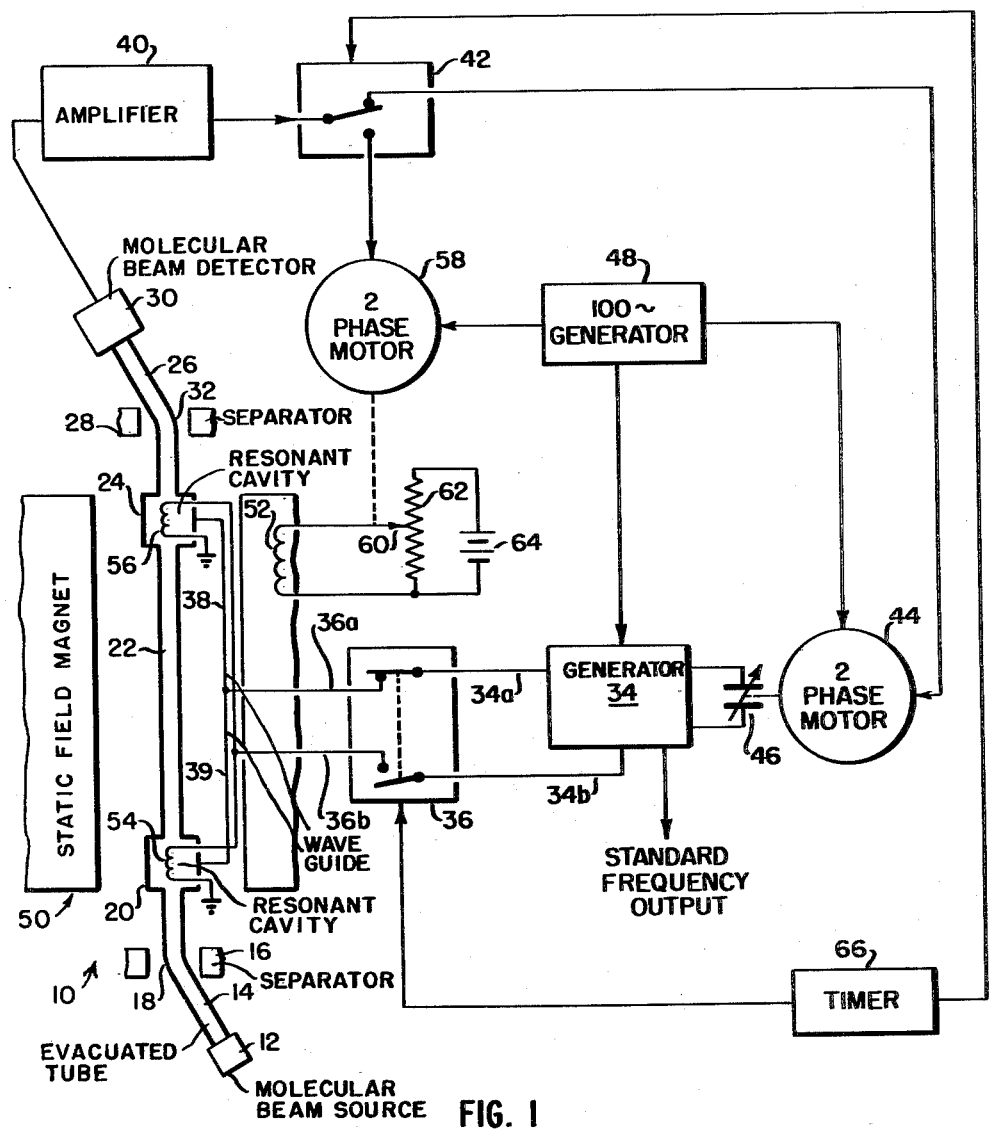

INVENTORS
ARTHUR O. McCOUBREY
JOSEPH H. HOLLOWAY
WALTER A. MAINBERGER
HAROLD D. GUY
BY

ATTORNEYS

INVENTORS
ARTHUR O. McCOUBREY
JOSEPH H. HOLLOWAY
WALTER A. MAINBERGER
HAROLD D. GUY
BY

ATTORNEYS

United States Patent Office 3,060,384
Patented Oct. 23, 1962

3,060,384
MOLECULAR BEAM FREQUENCY STANDARD INCORPORATING CONTROL OF STATIC FIELD
Arthur O. McCoubrey and Joseph H. Holloway, Topsfield, Walter A. Mainberger, Winchester, and Harold D. Guy, Reading, Mass., assignors to National Company, Inc., Malden, Mass., a corporation of Massachusetts
Filed Sept. 24, 1959, Ser. No. 842,018
17 Claims. (Cl. 331—3)

This invention relates to an improved molecular beam frequency standard of the type which uses an atomic or molecular resonance of the particles forming the beam to control the frequency of an oscillator. The beam is subjected to radiation at a molecular resonance frequency while in a static field, and the invention provides accurate control of this static field to increase the stability of the standard. More specifically, we control the static field by means of another resonance of the beam particles whose frequency is linearly dependent on the field.

Molecular beam apparatus of the type in which our invention may be incorporated is described in the copending application of J. R. Zacharias et al., for "Molecular Beam Apparatus," Serial No. 693,104, filed October 27, 1957, Patent No. 2,972,115, which is assigned to the assignee of this application. As disclosed therein, the frequency of a controllable oscillator is compared with an atomic resonance frequency, and a correction signal obtained from this comparison is used to correct the oscillator frequency and hold it at a specific desired value. More specifically, the frequency standard utilizes as a reference the substantially invariant frequency corresponding to the transition of a molecule or atom from one energy state to another. A beam of molecules, for example, may be passed through a magnetic or electric separator which screens out the molecules in the lower of the two states. The beam then enters a resonant cavity in which it encounters radiation from an oscillator whose frequency nominally equals the molecular or atomic resonance frequency corresponding to the difference in the energy levels of the two states. The relation between frequency and energy level separation is given by, $$\nu = \frac{W_2 - W_1}{h}$$

where: $\nu$ is the frequency, $(W_2 - W_1)$ is the difference in energy between the two states, and $h$ is Planck's constant. The molecules absorb energy from the radiation and enter a superposition state between the first two states.

Upon leaving the resonant cavity, the beam passes through an intermediate region where the molecules are essentially undisturbed by outside effects, and it then enters another resonant cavity to which energy from the oscillator is fed. A number of the molecules are lifted to the higher state and the others are returned to the lower state. The closer the frequency of the radiation corresponds to the resonant frequency, the greater is the number of molecules elevated to the higher state. The beam then passes through another separator which discards the molecules in one of the states and directs those in the other state to a detector. The detector provides an electrical signal proportional to the number of molecules impinging thereon. This signal is fed back to the oscillator to control the frequency thereof in such manner as to maximize the number of molecules making the transition to the higher energy state, thus maintaining the oscillator frequency at the value determined by the difference in energy between the two energy states.

The words "molecule" and "molecular" are used in their generic sense herein, as referring to the smallest particle in a gas capable of independent movement. Since such particles, particularly in the case of cesium and other preferred metals, may consist of single atoms, these words are used interchangeably with "atom" and "atomic."

In the copending application of J. H. Holloway, Serial No. 816,938, filed May 29, 1959, for "Molecular Beam Apparatus," and also assigned to the assignee of the present invention, a reflex type of resonance unit is described in which, after first being subjected to radiation at the molecular resonance frequency, the molecular beam is passed to a chamber from which the particles eventually rebound and pass through the resonant cavity for a second application of the resonant radiation. The basic principle of operation of this apparatus, however, is the same as that of the system described in the above Zacharias et al. application, and the present invention is therefore equally applicable thereto.

The frequency standards disclosed in the above-identified applications utilize energy levels of cesium or other alkali atoms which correspond to certain relationships between the magnetic fields of certain of their electrons and the atomic nuclei. In the case of cesium, these energy levels are the $(f, m_f)$ (3,0) and (4,0) levels. The molecules advance from the 3,0 level to the 4,0 level by absorbing energy from electromagnetic radiation through interactions of the electronic magnetic fields with the time varying magnetic field of the radiation. In order for the energy interchange to take place, the orientation of the electronic magnetic field must bear a given relationship to the magnetic field of the radiation. The magnetic field of an electron is caused by the spin of the charged particle, and its direction is along the spin axis. This axis normally undergoes a precessional movement, and the axis of precession should be perpendicular to the magnetic field of the radiation in order to maximize the number of molecules absorbing energy from the radiation. To provide this orientation in apparatus heretofore developed, the molecular beam is subjected to a weak static magnetic field during the periods in which it is subjected to the electromagnetic radiation and also between these periods. This field aligns the atomic nuclei and in so doing aligns the electron spin precession axes, which are governed by the nuclear alignment.

The static field also serves to shift, by different amounts, the energy levels corresponding to certain related transitions, including the desired frequency-controlling transition, from their zero field values. Thus, in the presence of this static field, radiation at a frequency corresponding to the desired transition, $(f, m_f)$ (3,0)→(4,0) in the case of $Cs^{133}$, will not cause any of the other transitions. In the complete absence of a static field, certain of these other transitions would occur at the same frequency as the (3,0)→(4,0) transition, but complete magnetic shielding necessary to eliminate a static field is almost impossible to obtain under ordinary conditions. The minute field, resulting from an effort at complete shielding, would produce a slight shift in the frequencies of the transitions from the zero field value and thereby broaden the effective resonance curve. It might even cause the system controlling the oscillator to follow a transition other than the correct one. Moreover, small field values would tend to permit a mixing of the selected magnetic substates and thereby nullify the effect of the state selector. With a small applied static field, on the other hand, the frequencies of the various transitions are separated sufficiently to prevent malfunctions of this nature.

The (3,0)→(4,0) transition is used as the frequency-controlling transition because its frequency varies only quadratically with the static magnetic field, as given by $$\nu = \nu_0 + 427 H_0^2$$

where, $\nu_0 = 9192631840$ cycles per second, and
$H_0$ is the static field in gauss.

$H_0$ is set at about $6 \times 10^{-2}$ gauss, so that the instability of the resonant frequency $\nu$ resulting from changes in the static field is much less than the instability of frequency standards using conventional high stability oscillators as references.

However, we have found that, in the range of stability of which a molecular beam frequency standard is capable, the dependence of the frequency upon the stability of the static field is significant. The relationship indicating this dependence is, $$\frac{\Delta \nu}{\nu_0} = 2 \frac{\nu - \nu_0}{\nu_0} \cdot \frac{\Delta H_0}{H_0}$$

where, $$\frac{\Delta \nu}{\nu_0}$$

is the fractional stability of the frequency, $$\frac{\nu - \nu_0}{\nu_0}$$

is the fractional frequency offset due to $H_0$, and $$\frac{\Delta H_0}{H_0}$$

is the fractional stability of the static magnetic field.

With above nominal value of $H_0$, the static field must be regulated to better than 1 percent to hold the frequency stability to 2 parts in $10^{12}$.

The same problem exists in other molecular beam frequency standards than the ones specially disclosed in the above copending applications. For example, the standard may utilize energy level transitions involving reactions with the electric rather than the magnetic field of the applied radiation, and in such case, a static electric field may be applied to the molecular beam during and between its interactions with the electromagnetic radiation. Further, static fields may be applied to molecular beam standards in which the molecules are subjected to the radiation for a single prolonged period instead of two spaced intervals. In each case, the stability of the particular molecular resonance used as a reference depends to a certain extent on the stability of the static field applied to orient the molecules of the beam.

Accordingly, it is a principal object of our invention to provide an improved molecular beam frequency standard capable of greater frequency stability than prior standards of this type. More particularly, it is an object of the invention to provide a molecular beam frequency standard incorporating precise control of the static field for increased stability of the molecular resonant frequency. A further object of the invention is to provide a molecular beam resonance unit incorporating static field control for stabilization of the molecular beam resonance frequency. Another object of the invention is to provide a static field stabilization system adapted for incorporation in molecular beam apparatus of the above character. A still further object of the invention is to provide apparatus of the above character which utilizes magnetically induced energy level transitions as a frequency-controlling mechanism. Other objects of our invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

Figure 2:
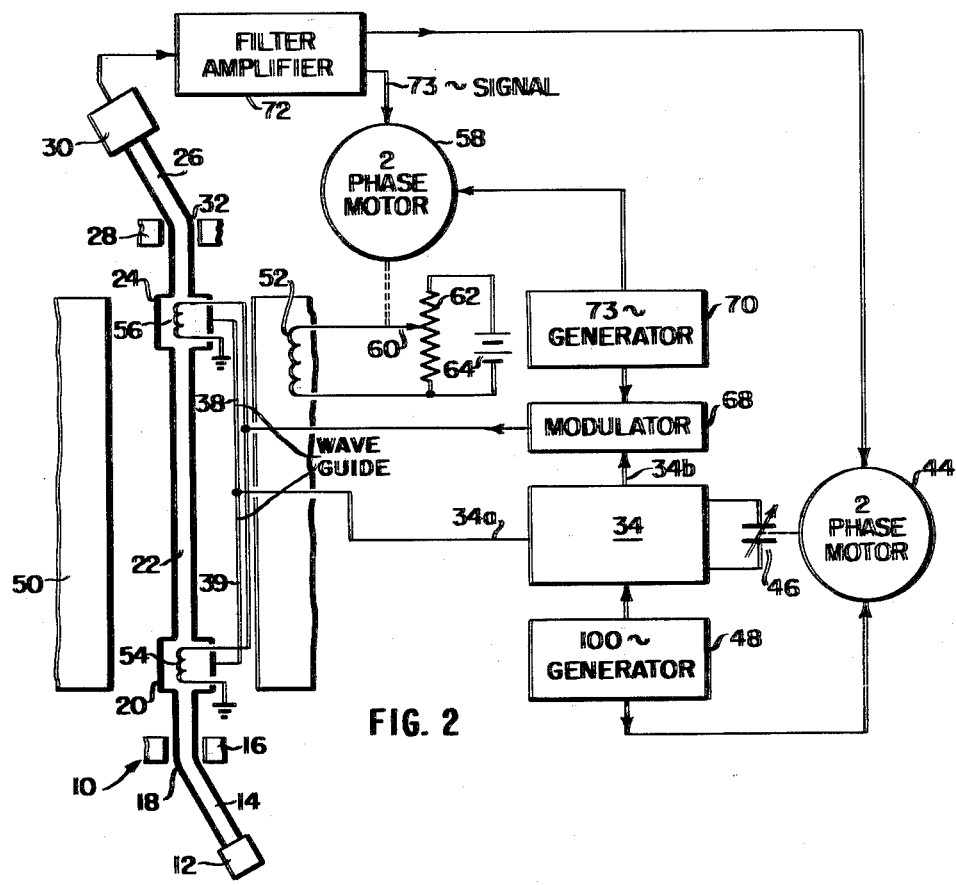
Figure 3:
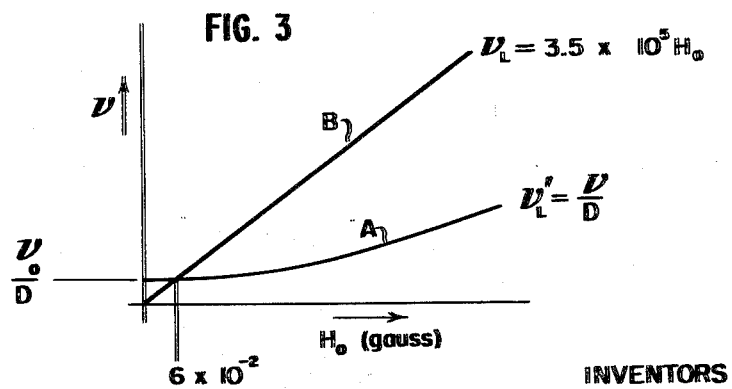
Figure 4:
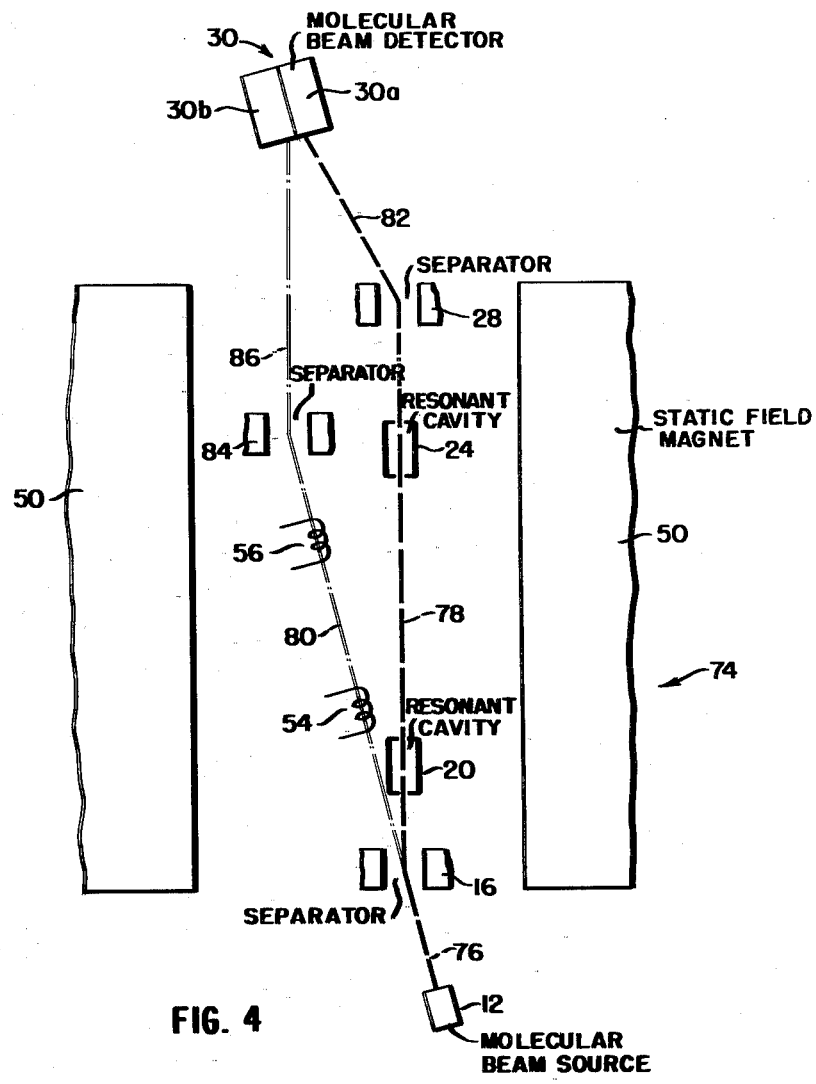

For a fuller understanding of the nature and objects of the invention, reference should be had to the following detailed description taken in connection with the accompanying drawings, in which:

FIGURE 1 is a schematic diagram of a molecular beam frequency standard incorporating the principles of our invention, FIGURE 2 is a schematic diagram of a second embodiment of our invention, FIGURE 3 is a graph relating the frequency-determining transition and the field-controlling transition to the static magnetic field in a frequency standard using a beam of cesium molecules, and FIGURE 4 is a schematic diagram of a modified resonance unit which may be incorporated in the embodiments of FIGURES 1 and 2.

Our invention makes use of molecular energy level transitions in controlling the static field and, more specifically, transitions of the molecular beam used in the frequency-determining mechanism. The field-controlling transition preferably involves a much smaller energy change than the frequency-determining one and therefore may be excited by radiation at a considerably lower frequency. The transition should be one whose frequency undergoes relatively large variations in response to changes in the static field. Thus, assuming the use of apparatus of the type described in the above copending applications, with the low frequency resonance excited from the stabilized local oscillator of the frequency standard, a large change in the output of molecules excited to the upper energy state in this transition will result from small changes in the static field. These variations in output serve as control signals in a servo system which regulates the field to maximize the number of molecules making the transition.

In the case of $Cs^{133}$ atoms, the field-controlling transition may be between the $f=4$, $m_f=-4$ and $f=4$, $m_f=-3$ energy states. The frequency $\nu_L$ of this transition is linearly related to the static magnetic field $H_0$ by $\nu_L = 3.5 \times 10^5 H_0$. For a static field of $6 \times 10^{-2}$ gauss, $\nu_L$ is approximately 210 kilocycles.

The same resonance units are those described in the above applications may be utilized, with minor modifications, to provide the low frequency field-controlling transitions. For the $(4,-4)$ $(4,-3)$ cesium transition, the modification may take the form of the addition of a pair of coils disposed along the beam. Thus, microwave energy supplied to the cavities will cause transitions at the high frequency of the frequency-stabilizing circuit, and excitation of the coils will cause transitions at the low frequency of the static field stabilization circuit. In one embodiment of our invention, the frequency and field stabilization circuits operate alternately on a time-sharing basis, and in another embodiment they operate simultaneously on a modulation frequency-sharing principle. Alternately, the beam may be divided into two portions to serve the two functions simultaneously.

As seen in FIGURE 1, the frequency standard may include a molecular beam resonance unit generally indicated at 10 of the type disclosed in the above copending application, Serial No. 693,104. The resonance unit 10 includes a molecular beam source 12 adapted to project a beam of cesium molecules through an evacuated tube 14 extending through a separator 16. The separator 16 may take the form of a magnet adapted to pass an intense inhomogeneous field through the tube 14. The cesium atoms in the $f=3$, $m_f=0$ state are deflected around a bend 18 in the tube 14 by the magnetic field and then proceed along the axis of the tube, while the atoms in the 4,0 state are deflected against the walls of the tube where they may be adsorbed by suitable getter material (not shown) or they may diffuse toward a vacuum pump (not shown). The beam, now including the bulk of the 3,0 atoms, passes from the tube 14 through a microwave cavity 20 and then through a connecting tube 22 to a second microwave cavity 24. The cavities 20 and 24 resonate at the frequency $v$, and some of the molecules are elevated to the 4,0 state therein.

Finally, the beam travels through a tube 26 extending through a second separator 28 to a detector 30. In the separator 28, which is similar to the separator 16, the atoms in the 4,0 state are deflected around a bend 32 in the tube 26 and then pass along the axis of the tube to the detector 30. The atoms in the 3,0 state are deflected against the wall of the tube to be adsorbed or diffused as described above. The detector 30 provides an electric signal whose magnitude is a function of the number of molecules coming from the separator 28.

The microwave cavities 20 and 24 are supplied with electromagnetic energy from the high frequency output 34a of a local generator 34 by way of a switch 36. The nominal frequency of this energy is the high frequency $v$ of the cesium $(3,0) \rightarrow (4,0)$ transition used as a frequency-standardizing mechanism. The corresponding output 36a of the switch 36 is coupled to the resonant cavities 20 and 24 by wave guides 38 and 39. Thus, with the switch 36 positioned to pass the high frequency energy to the wave guides 38 and 39, the molecular beam will be exposed to the microwave radiation in the cavities 20 and 24, and atoms in the 3,0 state will be raised to the 4,0 state and detected by the detector 30. The number of atoms undergoing this change of state depends on the correspondence of the frequency of the microwave energy in the cavities 20 and 24 to the natural atomic resonant frequency $v$ of the $(3,0) \rightarrow (4,0)$ transition. The closer the microwave energy is to the atomic resonant frequency, the greater will be the number of atoms elevated to the 4,0 state and the larger the magnitude of the output of the detector 30. The output of the detector is applied to a servosystem which regulates the frequency of the generator 34 to maximize the output of the detector and thereby maintain the high frequency output of the generator at the frequency $v$.

More specifically, the output of the detector 30 is amplified by an amplifier 40 and then passed through a switch 42 to a two-phase motor 44. The latter operates a variable condenser 46 controlling the frequency of the generator 34. The motor 44 is also excited by a 100 cycle generator 48 whose output is used to frequency modulate the high frequency output 34a of the generator 34 at a 100 cycle rate. The frequency modulation of the microwave energy moves the frequency thereof back and forth over the peak of the atomic resonance curve, resulting in amplitude modulation of the output of the detector 30. If the center frequency of the frequency-modulated microwave energy departs from the atomic resonance frequency, there will be a 100 cycle component in the output of the detector 30, and this will cause the motor 44 to rotate the condenser 46 in the proper direction to correct the error.

While the generator 34 is schematically indicated in FIGURE 1 by a single block, it actually consists of several units, including a local oscillator controlled by the motor 44 and synthesizing circuits comprising frequency multipliers, dividers and adders adapted to provide the high frequency $v$ at the output 34a and also a low frequency $v'_L$ at an output 34b. Frequency modulation of signals at the outputs 34a and 34b may be accomplished by conventional balanced phase modulators. The constituent parts of the generator 34 are disclosed in greater detail in the above copending application of J. R. Zacharias et al., Serial No. 693,104 and also the application of Mainberger for "Frequency Control Apparatus," Serial No. 744,729, filed June 26, 1958.

During the time the molecular beam particles are in the cavity 20, tube 22 and cavity 24, they are subjected to the static magnetic field $H_0$ generated by the coil 52 of an electromagnet 50. The means by which we control the field $H_0$ and thereby increase the stability of the frequency standard will now be described in detail.

A pair of coils 54 and 56, disposed in cavities 20 and 24, respectively, are excited with energy of the frequency $v'_L$ from the output 34b of the generator 34 by way of an output 36b of the switch 36. By appropriate circuits in the generator 34, this frequency is made to bear a constant relationship to $v$, the stabilized frequency of the generator, and therefore $v'_L$ bears the same relationship to the static field $H_0$, except for a proportionality constant. More specifically, $$v'_L = \frac{v}{D} = \frac{v_0 + 427 H_0^2}{D}$$

where D is a constant factor relating $v'_L$ to $v$. Nominally, $v'_L = v_L$, the frequency of the $(f,m)$ $(4,-4) \rightarrow (4,-3)$ transition of the cesium atoms forming the molecular beam in the resonance unit 10. The coils 54 and 56 are axially aligned with the beam which is thereby subjected to the alternating magnetic fields within them. They should be excited in phase with each other. In some instances the presence of the coils within the microwave cavities may deleteriously affect the microwave fields applied to the molecular beam. In such cases, the coils should be located outside the cavities, i.e., in the tubes (14, 22 and 26) through which the beam passes on its way from the separator 16 to the separator 28.

The $(4,-4) \rightarrow (4,-3)$ field stabilizing transition therefore takes place in the same manner as the $(3,0) \rightarrow (4,0)$ frequency-standardizing transition, and the current at the detector reflects the frequency of the proximity of the output 34b to the $(4,-4) \rightarrow (4,-3)$ transition frequency. The detector output signal, after amplification by the amplifier 40, is passed by the switch 42 to a two-phase motor 58. The latter controls the position of the tap 60 of a potentiometer 62 connected between the coil 52 and a battery 64 which energizes the coil. The motor 58 derives its other input from the 100 cycle generator 48.

Accordingly, when the switches 36 and 42 are positioned to energize the coils 54 and 56 and connect the amplifier 40 to the motor 58, the motor will control the potentiometer 62 to maximize the output of the detector 30 and thereby make the frequency $v_L$ of the $$(4,-4) \rightarrow (4,-3)$$

transition equal to the frequency $v_L$ at the output 34b of the generator 34. Should the field $H_0$ of the magnet 50 vary from the value corresponding to a transition at the frequency $v'_L$, the latter frequency will no longer be at the center of the $(4,-4) \rightarrow (4,-3)$ resonance curve, and a 100 cycle signal will appear at the output of the detector 30. Depending on the phase of this signal, the motor 58 will move the tap 60 of the potentiometer 62 to adjust the current through the coil 52. The current adjustment will change the static field to the correct value as indicated by a null in the 100 cycle output of the detector 30.

Since the generator 34 is stable to one part in $10^{11}$ even without stabilization of the static field, the field, which is regulated by a comparison with the frequency of the generator 34, may easily be stabilized to better than 1 percent in this manner. It should be noted that the field stabilization compensates not only for variations in the voltage of the battery 64, but also for variations in the magnetic field originating from other sources such as the earth's magnetic field. Variations of this type are encountered when the frequency standard is operated in a moving vehicle.

The switches 36 and 40 are controlled by timing pulses from a timer indicated at 66. The timer may take the form of a crystal-controlled oscillator connected to pulse-forming and counting circuits adapted to periodically actuate the switches 36 and 42. The switches may comprise conventional electronic and microwave gating circuits or electromechanical switches and need not be described in detail. The instabilities of the frequency standard due to changes in the static magnetic field are smaller and of a longer term nature than those due to deviations in the generator 34. Accordingly, the field stabilizing loop is operated for a much smaller portion of the time than the frequency stabilizing loop, e.g., 1 percent. The switches 36 and 42 are operated to connect the motor 44 and the generator output 34a to the amplifier 40 and wave guides 38 and 39, respectively, for correspondingly longer intervals than similar connections of the motor 58 and output 34b.

The minimum duration of each field-stabilizing period is limited by the fact that the two-phase motor 58 is essentially an averaging device and therefore should operate for several periods of the 100 cycle output of the generator 48 in order to position the tap 60 with desired accuracy. Furthermore, if one of the stabilization loops is switched into operation at the same instant the other one is switched out, there may be an error resulting from the transit time of the beam between the cavities 20 and 24. For example, if the switch 42 connects the output of the detector 30 to the motor 58 at the same time that the output 34b of the generator 34 is connected to the coils 54 and 56, there will be a period corresponding to the transit time of the beam during which the motor 58 receives no signal from the detector 30. Operation over several modulation frequency cycles eliminates this effect.

FIGURE 3 illustrates graphically the method by which our field stabilization system lends increased stability to the frequency stabilizing mechanism. The curve A represents the dependence of $\nu'_L$, the frequency at the output 34b on the static field $H_0$. The curve B shows the $$(4,-4) \to (4,-3)$$

transition frequency $\nu_L$ as a function of $H_0$. If $H_0$ varies from the nominal value of $6\times 10^{-2}$ gauss at the intersection of curves A and B, there will be a very small change in $\nu'_L$ and a much greater change in $\nu_L$. In other words, for the purpose of field stabilization, $\nu'_L$ may be considered to remain constant. Therefore, it serves as a standard frequency with which our system compares the frequency $\nu_L$. As a result of this comparison, $\nu_L$ is returned to the intersection of curves A and B through control of the field $H_0$. This serves to stabilize the field and thereby improve the stability of $\nu'_L$ and $\nu$ the stabilized frequency of the system.

The circuit of FIGURE 1 is particularly useful in cases where radiation at the field-stabilizing frequency will also affect the frequency-stabilizing transition of the molecular beam. In cases where the resulting decrease in the stability of the frequency standard is minimal, the beam may be subjected simultaneously to radiation at both frequencies. FIGURE 2 illustrates a system operating in this manner.

As seen in FIGURE 2, the switch 36 has been replaced by direct connections to the cavities 20 and 24 and coils 54 and 56 so that they will be excited simultaneously at the respective molecular resonant frequencies. In order to separate the field-stabilizing signals at the output of the detector 30, the two stabilization loops use different modulation frequencies. The high frequency output 34a of the generator 34 may be modulated by the 100 cycle generator 48 as described above, and this generator also supplies one of the two signals to the motor 44 controlling the frequency of the generator 34. The frequency $\nu'_L$ at the output 34b, however, is not modulated by the 100 cycle signal. Rather, this output is connected to a modulator 68 which frequency modulates the low frequency excitation of the coils 54 and 56 at the frequency of a generator 70. The latter frequency should be unrelated harmonically to the 100 cycle frequency of the generator 48. By way of example, a 73 cycle signal may be used.

Accordingly, the strength of the beam reaching the detector 30 will vary at both the 73 and 100 cycle rates imposed on the low and high frequency excitation of the resonance unit 10. The output of the detector 30 will contain 73 and 100 cycle components depending on the correspondence of the field $H_0$ and the high frequency $\nu$ to their nominal values. This may be better visualized by regarding the molecular beam in the resonance unit 10 as including two constituent beams, one of which is capable of undergoing the $(3,0)\to(4,0)$ transition, and the other the $(4,-4)\to(4,-3)$ transition. The intensity of one beam reaching the detector 30 is modulated by the frequency-stabilizing signal and the other by the field-stabilizing signal. The detector output reflects the sum of the signals resulting from this modulation.

To separate the signals appearing at the output of the detector 30, the circuit of FIGURE 2 is provided with a filter-amplifier 72 which passes the 73 cycle component of its input signal to the motor 58 and the 100 cycle component to the motor 44. The motor 44 then responds to changes in the frequency of the generator 34 by adjusting the condenser 46 in the manner described above. The motor 58 responds to variations in the static field $H_0$ by adjusting the potentiometer 62.

In FIGURE 4 we have illustrated a resonance unit 74 which isolates the low and high frequency energy state transition systems. The unit 74 may be incorporated in the frequency standard of FIGURE 2 to provide continuous control of both the static field and the standardized frequency while preventing undesirable interactions which, as pointed out above, may sometimes take place between the two systems. Instead of discarding one of the beams emerging from the separator 16, it makes use of both beams, one for the frequency-standardizing transition, the other for the field-controlling transition.

Thus, as seen in FIGURE 4, the molecular beam 76 from the source 12 is split into beams 78 and 80. The beam 78, containing the 3,0 and 4,—4 molecules, proceeds through the microwave cavities 20 and 24 and separator 28. The $(3,0)\to(4,0)$ transition takes place as described above, and a beam 82, containing the 4,0 molecules resulting from this transition, is directed by the separator 38 toward the detector 30.

The beam 80, containing the 4,0 and 4,—3 molecules in the beam 76, passes through the coils 54 and 56 which subject the molecules to energy at the lower transition frequency. This energy causes molecules in the 4,—3 state to drop to the 4,—4 state, and the relationship between the static field and the number of molecules undergoing this $(4,-3)\to(4,-4)$ transition is the same as for the $(4,-4)\to(4,-3)$ transition used in the resonance unit 10 of FIGURES 1 and 2. In other words, in apparatus of this type, the electromagnetic energy applied to a molecular beam can be used either to elevate the molecules to the upper of two energy states or to cause the molecules to drop to the lower of the states, depending on which beam emerging from the first separator is used for the transition. This applies to the frequency-controlling as well as the field-controlling transition. Thus, in FIGURES 1 and 2 the $(4,0)\to(3,0)$ and $(4,-3)\to(4,-4)$ transitions may be used by reversing the selected and discarded beams from the separator 16; in the resonance unit 74 of FIGURE 4, the $(4,0)\to(3,0)$ and $(4,-4)\to(4,-3)$ transitions may be used.

After passing through the coils 54 and 56, the beam 80 of FIGURE 4 enters a separator 84 which directs a beam 86 containing the 4,—4 molecules toward the detector 30. The detector 30 may contain a single detecting unit for direct substitution of the resonance unit 74 in the circuit of FIGURE 2. Alternatively, it may contain separate detecting units 30a and 30b for the beams 82 and 86. In the latter case, the outputs of the units 30a and 30b need not be filtered, but may be separately amplified and fed to the motors 44 and 58. When separate detecting units are used, the same modulation frequency may be used for both transitions, thereby considerably simplifying the apparatus.

The angles through which the various beams are deflected by the separators have been exaggerated in the drawings for the purpose of clarity. Actually, the beams 78 and 80 in FIGURE 4 are much closer together than illustrated, and a single vacuum envelope may surround both of them. Furthermore, the separators 38 and 84 may be combined into a single unit projecting the beams 82 and 86 in the desired directions.

It will be undersood that our invention may be practiced with equal facility as a part of frequency standards using molecular beams having electrically excited frequency-standardizing resonances. In such cases, a static electric field taking the place of the magnetic field $H_0$ may be stabilized by using low frequency, electrically excited resonances of the same molecular beam. The low frequency electric field could be applied between pairs of plates in the cavities 20 and 24, with the beam passing between the plates. Further, in some cases, the stability of the standard frequency is affected by both magnetic and electric fields, and our invention is applicable to this situation.

Thus, we have described a simple, compact apparatus for stabilizing the static field of a molecular beam frequency standard. The field-stabilizing mechanism compares the frequency of a field-dependent transition of the beam with a stable frequency from the stabilized generator of the standard. An error signal developed by this comparison is used to correct the static field to bring the frequency of this transition into correspondence with the standard, thereby imparting a high degree of stability to the field. Since the field-stabilizing circuit uses the same resonance unit as the frequency stabilizing apparatus, relatively few additional components are required. An increase in frequency stability of molecular beam frequency standards by an order or more of magnitude may thus be obtained at relatively low cost.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

We claim:

1. Molecular beam apparatus comprising, in combination, means forming a molecular beam, an energy source supplying energy for a first transition at a first transition frequency of said beam, means subjecting said beam to said energy, means developing a first signal dependent on the number of particles in said beam undergoing a transition at said first frequency, means controlling the frequency of said source in response to said first signal, field applying means for subjecting said beam to a static field affecting said first transition frequency, a stable generator supplying energy for a second transition at a second transition frequency of said beam dependent on said static field, means subjecting said beam to said energy at said second frequency, means developing a second output signal related to the number of particles in said beam undergoing said transition at said second frequency, and means controlling said static field in response to said second output signal to maximize the number of particles undergoing said transition at said second frequency.

2. The combination defined in claim 1 in which said second frequency is stabilized by said frequency-controlling means.

3. The combination defined in claim 1 in which the transition at said first frequency is a magnetically induced transition and said field applying means subjects said beam to a static magnetic field.

4. The combination defined in claim 3 in which said transition at said second frequency is magnetically induced.

5. The combination defined in claim 1 in which said transition at said second frequency is magnetically induced and including means powered by said energy source for subjecting said beam to an alternating magnetic field at said second frequency.

6. The combination defined in claim 1 in which the derivative of the frequency of said first transition with respect to said static field is substantially less at the static field value of said first frequency than the derivative of the frequency of said second transition with respect to said static field.

7. The combination defined in claim 1 including means for forming said beam of cesium atoms and in which said first frequency corresponds to the $(f,m_f)$ $(3,0) \rightarrow (4,0)$ energy state transition of said cesium atoms and said second frequency corresponds to the $(f,m_f)$ $(4,-4) \rightarrow (4,-3)$ transition thereof.

8. Molecular beam apparatus comprising, in combination, a first pair of spaced alternating current energy storing devices, a second pair of alternating current energy storing devices, a molecular beam source for projecting a beam of molecules through said pairs of devices, means for exciting said first pair of energy storing means at a first frequency corresponding to a first energy state transition of said molecules, a detector adapted to develop a first signal dependent on the number of particles in said beam undergoing said first transition, means controlling the frequency of said exciting means in response to said first signal to maximize the number of molecules undergoing said first transition, frequency stabilized means for exciting said second pair of energy storing means at a second frequency nominally corresponding to a second transition of said molecules, means for developing a second signal related to the number of molecules undergoing said second transition, field applying means for subjecting said beam to a static field affecting said first and second frequencies while said molecules are in said energy storing means, and means for controlling said field applying means in response to said second signal so as to maximize the number of particles undergoing said second transition.

9. The combination defined in claim 8 including means for fixing said second frequency at a fixed ratio to said first frequency.

10. The combination defined in claim 8 in which the frequency of said second transition is more dependent on said static field than the frequency of said first transition.

11. The combination defined in claim 8 in which said first energy storing means are microwave cavities and said second energy storing means are coils disposed within said cavities.

12. The combination defined in claim 8 including a single detector connected to develop separate output signals corresponding to said first and second energy state transitions.

13. The combination defined in claim 12 including first switching means for alternately exciting said first energy storing means and said second energy storing means and second switching means connected to switch the output of said detector to said frequency controlling means and field controlling means in synchronism with said first switching means.

14. The combination defined in claim 12 including means for frequency modulating at different rates the excitation to said first and second pairs of energy storing means and filters connected between said detector and said frequency stabilizing means and field controlling means, said filters selectively passing the modulation frequencies corresponding to the energy state transitions utilized respectively in controlling said first frequency and said static field.

15. Molecular beam apparatus comprising, in combination, a molecular beam source for forming a beam of like molecules, a generator having an output at a first frequency corresponding to a first energy level transition of said molecules, first energy storing means excited by said generator for subjecting said beam to radiation at said first frequency, field applying means for subjecting said beam to a static field affecting the frequency of said first transition, said generator having a second output frequency lower than said first frequency and corresponding to a second energy level transition of said molecules, second energy storage means excited by said generator for subjecting said beam at spaced intervals to radiation at said second frequency, the frequency of said second transition being more dependent on said static field than the frequency of said first transition, means for developing a first signal related to the number of molecules in said beam undergoing said first transition, means for developing a second signal related to the number of molecules in said beam undergoing said second transition, means for controlling the frequency of said generator in response to said first signal so as to maximize the number of molecules undergoing said first transition, and means for controlling said static field in response to said second signal so as to maximize the number of molecules undergoing said second transition.

16. The combination defined in claim 15 including a first switch arranged to alternately connect said generator to said first and second energy storing means and a second switch arranged to alternately apply said first and second signals to said frequency-controlling means and said field-controlling means in synchronism with said first switch.

17. The combination defined in claim 15 including means for frequency-modulating said first frequency at a third frequency, means for frequency-modulating said second frequency at a fourth frequency, a filter selectively passing said third frequency connected between said detector and said frequency-controlling means, a filter selectively passing said fourth frequency connected between said detector and said field-controlling means, said frequency-controlling means and said field-controlling means including phase-sensitive detectors for controlling said generator and said field.

No references cited.